Feb. 27, 1934.  J. V. GIESLER  1,948,659
THERMOSTATIC RADIATOR VALVE
Filed Dec. 28, 1931  3 Sheets-Sheet 1
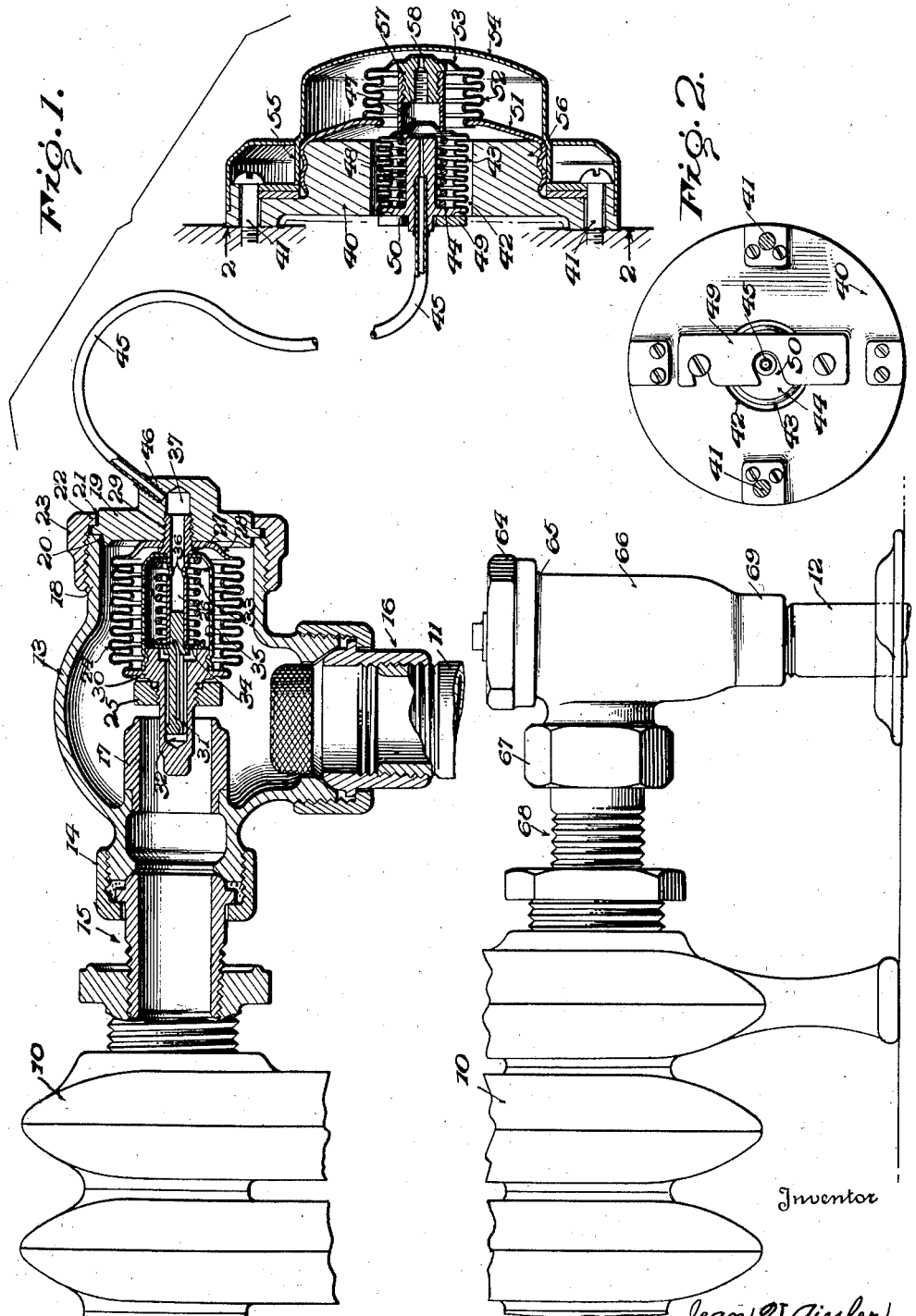
Inventor
Jean V. Giesler
By Cameron, Kerkam & Sutton
Attorneys

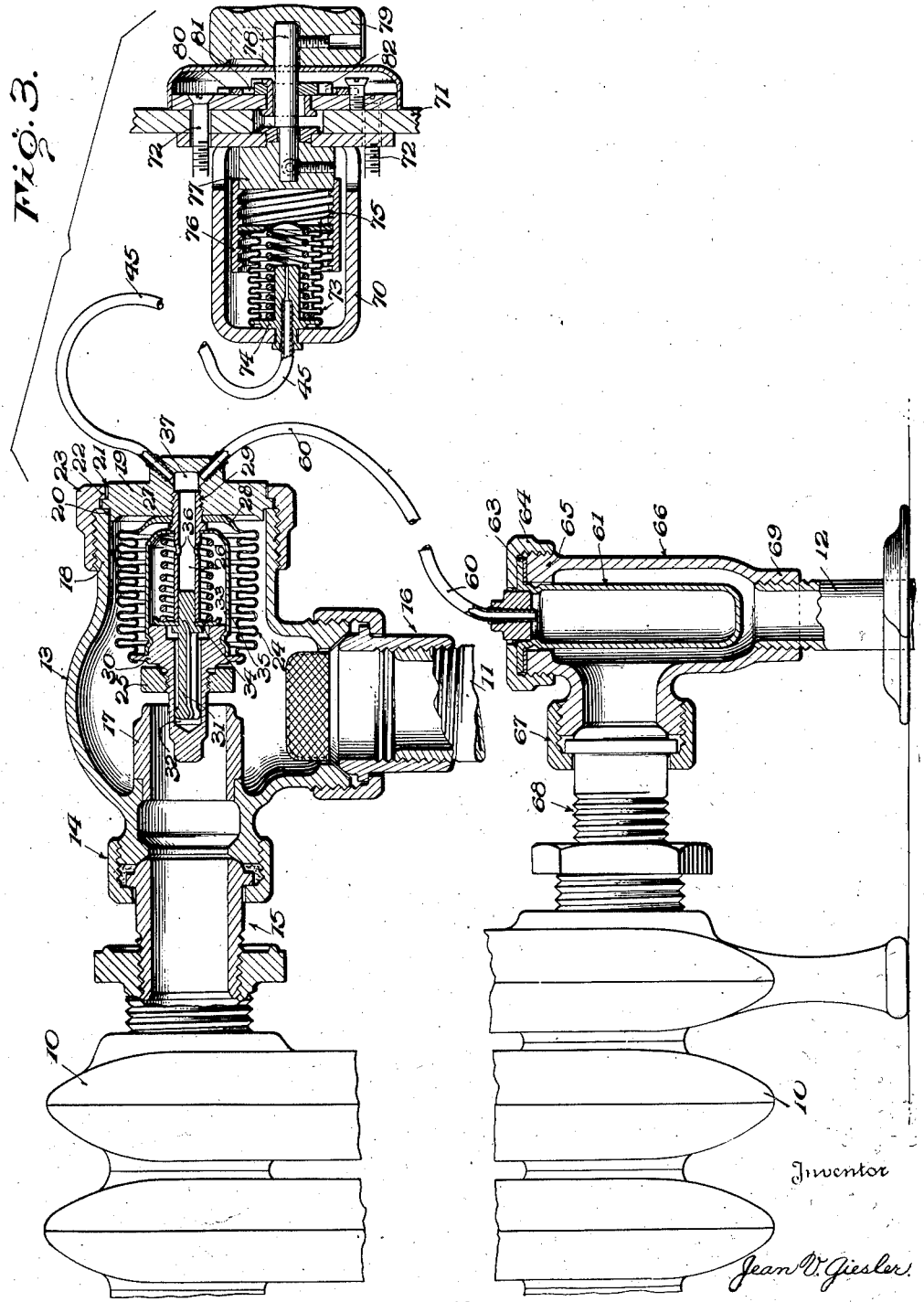

Feb. 27, 1934.  J. V. GIESLER  1,948,659
THERMOSTATIC RADIATOR VALVE
Filed Dec. 28, 1931  3 Sheets-Sheet 3

Inventor
Jean V. Giesler
By Cameron, Kerkam & Sutton
Attorneys

Patented Feb. 27, 1934

1,948,659

UNITED STATES PATENT OFFICE 1,948,659

THERMOSTATIC RADIATOR VALVE

Jean V. Giesler, Knoxville, Tenn., assignor to The Fulton Sylphon Company, Knoxville, Tenn., a corporation of Delaware Application December 28, 1931
Serial No. 583,559

20 Claims. (Cl. 236—37)

This invention relates to a temperature regulator and more particularly to a temperature regulator for controlling valve mechanism in a heat exchanger.

One of the objects of the present invention is to provide a novel method for controlling the flow of an influencing medium through a heat exchanger.

Another object of the present invention is to provide a novel method of controlling the flow of an influencing medium through a heat exchanger which utilizes the expansive force of a vaporized liquid injected into a motor in accordance with the temperature condition at a plurality of points with respect to the heat exchanger.

Another object of the present invention is to provide a novel apparatus for controlling the flow of a heating medium through a heat exchanger which injects quantities of a vaporizable fluid into an expansible motor in accordance with the temperature of the ambient to be controlled.

Another object of the present invention is to provide a novel apparatus for controlling the flow of a heating medium through a heat exchanger from a plurality of points with respect to the heat exchanger, each of which has a different effect on the controlling mechanism.

Another object of the present invention is to provide a novel apparatus for controlling the flow of a heating medium through a heat exchanger in accordance with either the temperature of the heating medium leaving the exchanger or the temperature of the ambient to be controlled, and in which each point of control affects the controlling mechanism to a different degree.

Another object of the present invention is to provide a novel apparatus for controlling the flow of a heating medium through a heat exchanger in accordance with either the temperature of the heating medium leaving the heat exchanger, or the temperature of the ambient closely adjacent the exchanger, or the temperature of the ambient remote from the exchanger, or any two thereof, and in which each affects the controlling mechanism to a different degree.

Another object of the present invention is to provide a novel adjustable apparatus for controlling the flow of a heating medium through a heat exchanger which is simple and compact, cheaply manufactured, and efficient for the purpose intended.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings,

Fig. 1 is a side elevation partly in section of one embodiment of the invention as applied to a heat exchanger;

Fig. 2 is an end elevation of the thermostat unit shown in Fig. 1;

Fig. 3 is a side elevational view partly in section of another embodiment of the invention applied to a heat exchanger;

Figure 4:
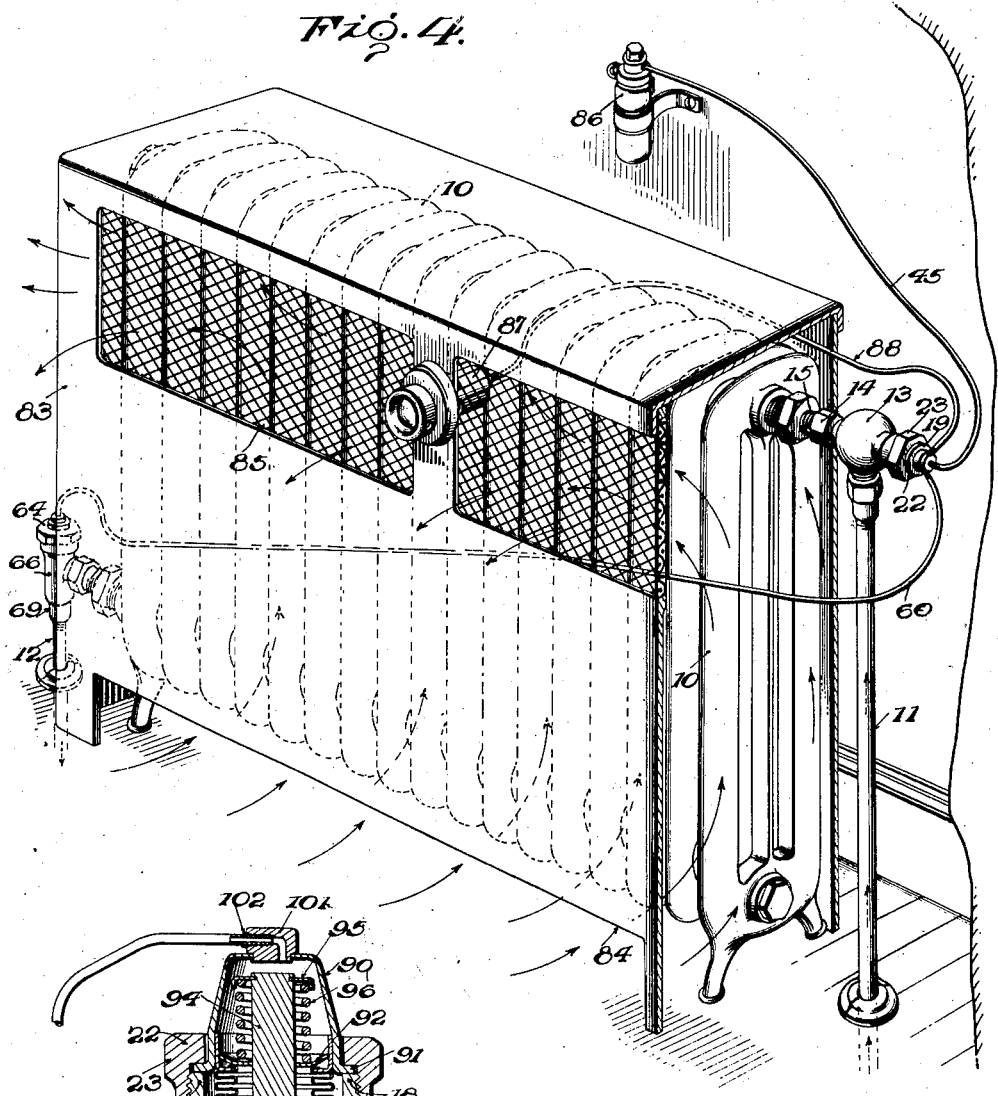
Fig. 4 is a perspective view of a third embodiment of the invention showing the elements in an assembled position on a heat exchanger.

In heat exchanging apparatus where an influencing medium such as steam or a refrigerant affects a surrounding ambient, such as a liquid or air, by a transmission of heat through the exchanger, the temperature of the ambient may be controlled by varying the flow of the influencing medium through the heat exchanger by suitable valve mechanism. The method of temperature regulation of the present invention employs the injection of quantities of a liquid into an expansible motor operatively connected with the valve mechanism, in accordance with increases in the temperature of the ambient above a predetermined minimum, and of then vaporizing the injected liquid to expand the motor and actuate the valve mechanism; the operation continuing with continued increases in temperature of the ambient until the valve is entirely opened or closed depending upon the function of the influencing medium.

With the method thus far described the temperature of the ambient may be properly regulated, but the method is apt to be wasteful, as for example in the case of a heating medium, because, if the ambient is not sufficiently heated to effect the actuation of the valve, the heating medium may flow through and leave the heat exchanger without giving up an efficient amount of its heat. The present method includes the injection of quantities of a liquid into the expansible motor from a plurality of points in accordance with the temperature at these points so that the flow of the influencing medium through the exchanger may be controlled for affecting a condition in the ambient and a condition in the exchanger, to prevent a wasteful use of the influencing medium and inefficient use of the apparatus. In the example above cited the liquid would be injected in accordance with the temperature of the ambient and the temperature of the influencing medium leaving the heat exchanger.

It is desirable, when controlling the flow of the influencing medium in accordance with the temperature of the ambient, to gradually decrease or throttle the flow until an equalized condition exists in which the flow is such that the temperature of the ambient remains constant, but of course the flow is capable of being entirely stopped. On the other hand, if an influencing medium, leaving the exchanger, varies only a few degrees in temperature the valve mechanism should be actuated. As an example, when using steam as an influencing medium there is critical temperature at which all of the latent heat has been dissipated and the steam is condensed. When the temperature of such condensate is a few degrees below this critical temperature the valve mechanism should be entirely open, and as the temperature of the condensate increases the valve mechanism should throttle the flow and when live steam leaves the exchanger the valve should be entirely closed as considerable latent heat escapes with the exhaust and the exchanger becomes inefficient in its transfer of heat. To this end the method includes the injection of a small amount of the vaporizable liquid upon an increment of increase in the temperature of the ambient, and an injection of a different amount of the liquid upon the same increment of increase in the temperature of the influencing medium leaving the exchanger.

The method also may include the control of the flow of the influencing medium through a heat exchanger from a third point together with one or both of the two already described, which third point may be closely adjacent the exchanger and at which the ambient to be controlled is in its most effective condition. With the three point control a much closer regulation may be had as operation of the valve mechanism is indicative of the condition of the ambient as a whole and not merely at one point in the ambient. With this method either of the points of control in the ambient may close the valve while the other is in a condition to hold the valve open, but the valve mechanism will always be closed when the condition at any point is such that the valve should be closed.

In the drawings, several embodiments of apparatus are shown for carrying out the above described method. Referring to Fig. 1 a novel apparatus is shown as applied to a heat exchanger which for purposes of illustration is in the form of a sectional type radiator 10 having an inlet conduit 11 and an outlet conduit 12, the conduits being connected in the usual manner with the supply and exhaust mains for the heating medium. Preferably the controlling means for varying the flow of a heating medium through the radiator is contained in a right angular coupling 13 having connecting means 14 for engagement with a nipple 15 of the radiator at one end and connecting means 16 for engagement with the inlet conduit 11 at the other end. As shown, this hollow coupling 13 is provided interiorly with an annular valve seat 17 in axial alignment with the nipple and connecting means 14 and 15, and with an exteriorly threaded annular boss 18 on the side opposite the connecting means 14, defining a circular opening in the coupling member. A circular plate 19 for carrying the controlling mechanism is adapted to fit in the circular opening in the coupling 13 and has an annular recess 20 on one side for engagement with the periphery of the boss 18 and an annular recess 21 on the opposite side for engagement by the flange 22 of a nut 23 having a screw threaded interior portion for engagement with the boss 18 and adapted to hold the plate in position on the coupling member.

The controlling mechanism mounted on the plate 19 and extending into the coupling 13 consists of a flexible bellows 24 constituting a motor element and a valve member 25 adapted for cooperation with the annular valve seat 17. The bellows 24 is mounted on the plate 19 and rigidly attached thereto at one end by means of a spindle 26 extending through the bellows and provided with a shoulder 27 engaging the inner side of the bellows head 28 on one side, and having a screw threaded shank 29 cooperating with a threaded aperture in the plate 19. When the spindle 26 is properly positioned in the plate 19 the shoulder 27 forces the head 28 of the bellows 24 into tight engagement with the plate 19, this connection being reenforced if necessary as by solder or the like. At the opposite end, the bellows 24 is provided with a movable head 30 tightly sealed to the bellows wall by any suitable means, and carrying the valve head 25 attached thereto in any suitable manner and illustrated as a screw threaded connection. The head 30 may be guided by an extension 31 of the spindle 26 positioned in a bore 32 of the head. The bellows is held in a retracted or collapsed condition by a spring 33 surrounding the spindle 26 and engaging an abutment 34 on the spindle at one end and an extended apertured collar or spider 35 attached to the movable head 30 of the bellows at the other end. As will be apparent, the bellows being positioned in the coupling 13 and on the side of the valve seat 17 adjacent the inlet conduit 11, it is in the path of the heating medium entering the radiator, such as steam, so that the bellows is always subjected to the temperature of the heating medium. However, as the invention is not necessarily limited to use on a radiator, the bellows may be heated by any suitable means other than the influencing medium if desirable.

In the illustrated embodiment the bellows 24 is normally held in its retracted collapsed position with the valve member 25 out of engagement with the valve seat 17 by means of the spring 33, and is dependent for its operation upon a vaporizable liquid being injected into the bellows, which when vaporized by the heating medium surrounding the bellows, expands the bellows and actuates the valve 25 toward the valve seat 17. To this end the spindle 26 is hollow for a portion of its length extending from the end engaging the head 19 to a point within the bellows 24. To connect the hollow interior of the spindle 26 with the bellows, suitable apertures 36 are provided in the spindle. At the outer end the hollow spindle communicates with a recess 37 in the plate 19 to which the vaporizable fluid is supplied.

In the embodiment illustrated in Fig. 1, the novel apparatus incorporates the use of a thermostat positioned in the ambient the temperature of which is to be regulated, and which will cause an injection of quantities of a vaporizable liquid into the hot bellows upon an increase in temperature of the ambient above a predetermined minimum. The thermostat consists of a base plate 40 adapted to be attached by means of screws 41 to any suitable support in the ambient to be controlled. This base plate 40 is centrally apertured as at 42 to receive a flexible container in the form of a bellows 43 having a stationary head 44 and communicating with one end of a suitable, preferably flexible, tube 45 secured in a central bore provided in the head and attached thereto as by means of solder. This tube 45 extends to the motor element and is connected, for communication therewith, to the plate 19, opening into the recess 37, and hollow spindle 26. At the other end the bellows 43 is provided with a movable head 47, and a spring 48 positioned within the bellows for holding the bellows in a normally extended position. The bellows is suitably held in position within the aperture 42 as by means of a bar 49 (more clearly shown in Fig. 2) pivotally connected to the base 40 at one end and adapted to be swung into position under the stationary head 44, a slot 50 in the bar 49 encompassing a boss on the head of the bellows. This bellows 43 and tube 45 is adapted to contain a thermosensitive liquid vaporizable at the temperature of the motor bellows 24, when injected into the motor and heated by the surrounding medium, to actuate the valve 25.

A thermostat having an adjustable actuating unit for the bellows 43 is preferably provided, and as illustrated comprises an inner casing part 51 centrally apertured and forming a rigid support for one end of a bellows 52 having a movable head 53. An outer casing part for the actuating unit includes a surrounding shell 54 fixed to the inner casing part in any suitable manner, as by welding, for forming a closed chamber between the inner casing part 51 and the outer shell. A depending skirt 55 on the inner and outer shells has screw threads for engagement with a screw threaded shoulder 56 on the base. An annular abutment 57 projects from a boss on the movable head 53 for engagement with the movable head 47 of the flexible container 43. This boss is centrally bored as at 58 for initially charging the unit with a suitable thermosensitive fluid which expands within the temperature range of the ambient to be controlled for actuating the movable head 53. After the initial charge of vaporizable liquid has been placed in the chamber between the shells 51 and 54 and sealed and the unit screwed to an adjusted position on the shoulder 56, the abutment 57 acts as an actuating means for the flexible container 43. The exact temperature at which it is desired that the apparatus act may be determined by rotating the actuating unit on the base 40, and by reason of the screw threaded connection between the parts 55 and 56, such rotation reduces or increases the movement of the head 53 necessary to cause the abutment 57 to engage the head 47 of the container, as the case may be.

The operation of the apparatus thus far described is as follows. Let it be assumed as a starting condition that the ambient, the temperature of which is to be controlled, is cold and the thermostat unit contracted so that the abutment 57 is out of engagement with the flexible container 43 which holds the vaporizable liquid. In this condition the vaporizable liquid is withdrawn from the bellows 24 into the passages including tube 45 and said motor element will be held in a retracted position by the spring 33 so that the valve is open, allowing the influencing medium to flow through the heat exchanger. As this condition continues the ambient will absorb the heat from the exchanger and its temperature increase until such time as the thermostat unit positioned in the ambient is expanded and the abutment 57 of the bellows 53 engages the movable head 47 of the flexible container 43. This position indicates the predetermined minimum at which the apparatus initially operates to inject fluid into the motor, and may be varied by varying the relative position of the abutment 57 to the movable head 47 in rotating the whole unit on the shoulder 56 of the base 40.

As the temperature increases above the predetermined minimum the abutment will force the movable head 47 inwardly and cause the thermosensitive liquid to be forced from the tube 45 in definite quantities per increment in the increase in temperature. The liquid forced from the tube 45 will enter the recess 37 and flow through the hollow spindle 26 and apertures 36 into the bellows 24 and be vaporized by the surrounding medium. This vaporization of the liquid so increases the pressure as to extend or expand the bellows 24 against the action of the spring 33 and move the head 30 together with the valve 25 toward the valve seat 17 to decrease the amount of medium entering the heat exchanger or in other words cause a throttling effect.

This operation may be repeated on increase in temperature at the thermostat unit until such time as the valve 25 entirely closes the valve opening by engaging the valve seat 17. However, as the temperature increases the valve is moved toward the valve seat and throttles the amount of heating medium entering the heat exchanger, which in turn varies the amount of heat transmitted to the ambient, so that an equalized condition may be maintained in which sufficient heat is transmitted to the ambient only to maintain the ambient at a constant temperature. When the temperature of the ambient decreases the thermostat retracts the abutment 57 allowing the spring 44 to expand the flexible container 43 which will draw the fluid from the motor 24 into the cooler passages including tube 45 where it condenses allowing the spring 33 to move the head 30 of the motor bellows and valve 25 to an open position. The novel construction of thermostat illustrated may be easily installed and removed because of its retention in position by the pivoted bar 49.

The form of novel apparatus illustrated in Fig. 3 incorporates the use of a plurality of temperature responsive sources of the vaporizable liquid, one of which is positioned in the ambient to be controlled and the other positioned in the path of the influencing medium leaving the heat exchanger, and each of which is adapted to control the valve mechanism by injecting quantities of vaporizable liquid into the hot bellows. In this form for purposes of illustration the apparatus is shown as applied to a sectional type radiator 10 the same as in Fig. 1, with the motor element of identical construction with that illustrated in the previous embodiment. In this embodiment, however, a second conduit 60 extends from the recess 37 in the plate 19 to a container 61 positioned in the drain or outlet pipe 12 of the radiator where it is subjected to the temperature of the condensate (in the case of steam) or the influencing medium leaving the heat exchanger whatever it may be.

This second source of liquid positioned in the path of the influencing medium leaving the exchanger is illustrated as in the form of a rigid container having a radial flange 63 at one end adapted to be positioned between a screw threaded cap 64 and a boss 65 on an outlet coupling 66. This outlet coupling is of the usual right-angular type having connecting means 67 at one end for engagement with a nipple 68 of the radiator and connecting means 69 at the other end for engagement with the outlet conduit 12. This container 61 is adapted to contain a liquid vaporizable at the temperature of the motor bellows 24 the same as the container positioned in the ambient, and it preferably has a volume different from that of the container in the ambient. A small increase in temperature will cause an expansion of the liquid in the container 61 with an injection of a quantity of the liquid into the motor bellows 24 sufficient to entirely close the valve, the liquid being forced from the tube 60 into the recess 37 in the plate 19 and hollow spindle directly into the hot bellows as previously described.

The full efficiency of the apparatus may then be had as the heating medium in the radiator will be held until it has transmitted or dissipated sufficient heat to cause the temperature of the medium leaving the radiator to have decreased sufficiently so that the container 61 will retract the injected liquid from the motor and allow the valve to be opened by means of the spring 33. This action of the container 61 will not affect the operation of the thermostatically controlled container of vaporizable liquid positioned in the ambient which may also close the valve if that temperature becomes sufficiently high or the two by their joint action may cause the valve to be closed.

The thermostatically controlled unit positioned in the ambient may be of the type disclosed in the embodiment of apparatus illustrated in Fig. 1 or may be of such form as that shown in Fig. 3. This unit includes a frame 70 adapted to be rigidly attached to a supporting member 71 by any suitable means such as that illustrated at 72. Within the frame 70 is a flexible bellows 73 having a head 74 suitably attached to the frame and into which the conduit 45 extends, and which is sealed thereto by means of solder or the like. At the opposite end of the bellows 73 a head 75 is provided having a projecting flange with a helical periphery. This flange is adapted for engagement with an internally threaded nut 76, which after once being set is held in a stationary position, but which for purposes of adjustment may be rotated to either extend or contract the bellows and vary the internal volume thereof. To rotate this nut 76 a block 77 is fixed to the open end of the nut and has a shaft 78 connected thereto at one end in a central bore of the block and at the other end provided with a handle 79, so that by rotating the handle the shaft 78 and block 77 together with the internally threaded nut 76 are rotated. Between the supporting element 71 and the shaft 78 suitable mechanism is provided for preventing unnatural strains from being placed on the bellows 73 by preventing wide ranges of adjustment. This mechanism includes a ring 80 having an abutment 81 extending into position to be engaged by a tongue 82 rotatably fixed to the shaft 78. With this construction a rough adjustment may be made and the ring 80 fixed on the stationary supporting member, after which the shaft 78 and tongue 82 may only be rotated one complete revolution to give a fine adjustment.

In the embodiment of the apparatus illustrated in Fig. 4 a third source of vaporizable liquid is provided which is also positioned in the ambient but closely adjacent the heat exchanger, this apparatus as shown also including a source of vaporizable liquid positioned in the ambient remote from the heat exchanger and a source of vaporizable liquid positioned in the path of the influencing medium leaving the heat exchanger as illustrated in Fig. 3. In this embodiment, the apparatus is shown as applied to a heat exchanger of the radiator type 10, as in Figs. 1 and 3, but includes a housing 83 surrounding the radiator and having an inlet aperture 84 for the ambient at the bottom and an outlet aperture 85 at the top. The motor element may be identical with that disclosed in Figs. 1 and 3 and is positioned in the right-angular coupling 13 as previously described with a conduit 45 leading from the recess 37 in the plate 19 to a container 86 positioned in the ambient whose temperature is to be controlled but remotely with respect to the radiator 10. This embodiment also includes a second tube 60 extending from the recess 37 to a container 61 positioned in the outlet coupling 66 of the radiator, as illustrated in Fig. 3 and previously described. The third container 87 is or may be of the same type as explained as regards Fig. 3 but is positioned within the outlet aperture 85 of the housing 83 and directly in the path of the ambient leaving the radiator, and is connected by means of a tube 88 with the recess 37 in the supporting plate 19. The container 86 may be located in any suitable position with respect to the radiator and is shown in the form of a rigid container similar to the container 61 and preferably has sufficient volume to actuate the motor 24 and valve 25 to a closed position upon a small range in temperature.

With this apparatus a high efficiency of heat transmission is possible from the heat exchanger as the flow of the heating medium is controlled in accordance with the temperature of the medium leaving the heat exchanger. Also with this apparatus excessively high temperatures of the ambient leaving the radiator is prevented by the temperature responsive device positioned closely adjacent and in the path of the ambient leaving the radiator. This temperature responsive device may be so constructed and charged that its effect is slight as compared with the other two temperature responsive devices, so that its effect will be to throttle rather than entirely shut off the supply of heating medium except in cases of extremely high temperatures. Further, with this apparatus a closer control may be had as the two devices positioned in the ambient give a more accurate indication of the actual temperature of the ambient because positioned at two separated points. In this apparatus as in the form described and illustrated in Fig. 3 the effect of each container for vaporizable liquid upon the motor element is different because different and varying quantities of the liquid are injected per increment of increase in temperature. In this embodiment of the invention the apparatus may be so constructed and the charge of fluid in the system so proportioned, that the container 87 positioned in the path of the ambient leaving the heat exchanger conditions the valve mechanism to maintain the temperature of the ambient leaving the exchanger constant, while the containers 61 and 86 function as an off and on control for the valve mechanism.

Figure 5:
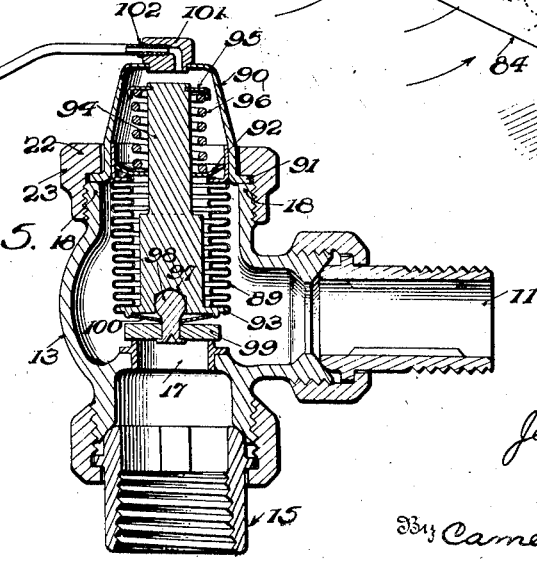
Fig. 5 is a side elevational view in section of a modified motor and valve mechanism from those shown in Figs. 1 and 3.

In Fig. 5 a different form of motor element is illustrated which may be used in place of the motor element illustrated in Figs. 1, 3 and 4. This motor element is supported by a right-angular coupling member 13 for connecting the inlet conduit 11 with a nipple 15 on the heat exchanger. The motor element consists of a flexible bellows 89 having a bell shaped stationary head 90 attached thereto at one end and provided with a radial flange 91. This flange 91 is adapted to be positioned between the end of the boss 18 and the flange 22 of the nut 23 for rigidly holding the motor element in position in the coupling 13 with the motor extending into the coupling as in the previously described embodiments. Interiorly of the head 90 an apertured abutment 92 is provided and suitably fixed to the head by any suitable means such as welding or soldering. At the other end of the bellows a movable head 93 is sealed to the wall of the bellows and has a stem 94 extending through the bellows to a position in the bell shaped head 90. At the end of this stem another annular abutment 95 is provided for receiving one end of a compression spring 96 surrounding the stem and engaging the abutment 92 at its other end. In this manner the bellows 89 is held in a normally retracted or collapsed condition by the spring 96.

At the outer end the head 93 has a recess 97 for receiving a spherical extension 98 on a valve element 99 similar to the valve member 25 previously described. Between the head 93 and the valve element 99 a flexible disk 100 is provided giving a certain flexibility between the head and valve and allowing a proper seating of the valve 99 on the valve seat 17 without creating any undue strain in the motor element when not properly aligned. At the outer end of the bell shaped head 90 a connection block 101 is provided and fixed thereto by any suitable means such as soldering or welding and has one or more apertures 102 adapted for connection with a tube or tubes leading to the various containers for vaporizable liquid.

As will now be apparent a novel method and apparatus for regulating the temperature of an ambient has been provided having few parts but which will maintain the temperature of the ambient at a substantially constant temperature.

With the method and apparatus described above it will be apparent to one skilled in the art that the temperature of the ambient may be controlled by the differential temperature between any of a plurality of points. Further with this method and apparatus the effect produced on the controlling mechanism from each point of control may be widely varied by varying the relative volumes of the containers subjected to the respective temperatures. It therefore results that with applicant's invention including a plurality of containers for vaporizable liquids various combinations and variations in effect of the system may be used to give a wide variety of results desired in the regulation of temperatures under particular conditions presented by individual problems of temperature regulation. As all of the containers for the vaporizable liquid are in open communication with the common motor vessel 24 as well as with each other, said containers and motor vessel constitute an intercommunicating system of fixed volume except that said volume may be adjustable as in the embodiment of Fig. 3 or said volume may be predeterminately varied by thermostatic means acting thereon during a certain temperature change as in the embodiment of Fig. 1, for example. The relative effects of said containers are dependent upon their relative volumes of liquid and therefore the change in volume of liquid under a predetermined temperature change or upon the relative change in volume under thermostatic control, but as all of said containers are in communication through the common inlet 37 of the motor vessel, their action is interrelated. Yet each container is a separate source from which liquid is forced into the motor vessel to an amount depending upon the volume change thereat, which in turn is dependent on the capacity of the container and the range of temperature acting thereon. Therefore the system as a whole is conditioned by the physical conditions to which the containers are subjected and it responds predeterminately to a change at any one of the containers to control the amount of vaporizable liquid that shall be vaporized by heat applied to the motor vessel.

It will also be apparent to those skilled in the art that the invention is not necessarily limited to the exact forms of construction shown but is capable of a variety of mechanical embodiments. It is to be understood that this apparatus even though shown as applied to a radiator is not limited to use with a radiator but could as well be used with any heat exchanging apparatus and could control the flow of a refrigerant and be actuated by the temperature of the circulating medium surrounding the refrigerant coils. Although the motor element is shown in the drawings as being heated by the influencing medium the motor could be heated by any other suitable means, and other forms of motor and other forms of temperature responsive device for injecting quantities of a vaporizable liquid into the hot motor than those shown in the drawings may also be used without departing from the spirit of the invention. Reference is therefore to be had to the appended claims for a definition of the limits of the invention.

What is claimed is:

1. In a temperature regulator for a heat exchanger, an expansible and contractible bellows for varying the flow of an influencing medium through the exchanger, an apertured support positioned in the ambient to be controlled, a flexible container for a vaporizable liquid positioned in the aperture of the support and communicating with said bellows, a pivoted bar on one side of the support for holding the container in position, and means for engaging the container and forcing quantities of the vaporizable liquid into the bellows upon increases in temperature.

2. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel and adapted respectively to inject quantities of said vaporizable liquid into said motor vessel in conformity with variations of temperature at the respective containers.

3. In a temperature regulator for a heat exchanger, in combination with a valve for varying the flow of an influencing medium through said exchanger, an expansible and collapsible motor vessel operatively connected to said valve and subjected to the heat of said influencing medium, and a system in communication with said motor vessel for predeterminately injecting quantities of a vaporizable liquid into said vessel whereby said liquid is vaporized by the heat applied thereto and said motor vessel actuated, said system including a plurality of containers of different size for said vaporizable liquid in communication with said motor vessel and adapted to be subjected to different temperature ranges whereby said containers eject differential amounts of said vaporizable liquid into said motor vessel depending upon the volume and the temperature range of the respective containers.

4. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel respectively subjected to different points of temperature control in the ambient and respectively adapted to eject differential quantities of vaporizable liquid into said motor vessel depending upon the respective temperature variations at the respective containers.

5. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel, one of said containers disposed adjacent to said heat exchanger in the path of ambient flowing thereover and the other of said containers being disposed relatively remote from said heat exchanger but subjected to its influence, and said containers being respectively adapted to eject differential quantities of vaporizable liquid into said motor vessel depending upon the respective variations of temperature at the respective containers.

6. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel, one of said containers being subjected to the ambient and other of said containers being subjected to said influencing medium, and said containers being adapted to eject differential quantities of vaporizable fluid into said motor vessel depending upon the respective variations of temperature at the respective containers.

7. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of vaporizable liquid into said vessel whereby said liquid is vaporized by the heat applied thereto and said motor vessel actuated, said system including a plurality of containers of different size for said vaporizable liquid in communication with said motor vessel whereby a small change in temperature at one container will actuate said motor vessel to the same extent as a larger change of temperature at another container.

8. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers of different size for said vaporizable liquid in communication with said motor vessel, a container of larger size being subjected to the influencing medium at the outlet from said exchanger, and a container of smaller size being subjected to the ambient.

9. In a temperature regulator for a heat exchanger, in combination with a valve for varying the flow of an influencing medium through said exchanger, an expansible and collapsible motor vessel operatively connected to said valve and subjected to a source of heat, a system including a plurality of containers for said vaporizable liquid in communication with said motor vessel for predeterminately injecting quantities of a vaporizable liquid into said vessel whereby said liquid is vaporized by the heat applied thereto and said motor vessel actuated, and means cooperating with one of said containers to vary the internal volume of said system.

10. In a temperature regulator for a heat exchanger, in combination with a valve for varying the flow of an influencing medium through said exchanger, an expansible and collapsible motor vessel operatively connected to said valve and subjected to the heat of said influencing medium, a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel and respectively subjected to different sources of temperature control, and temperature responsive means for varying the volume of said system.

11. In a temperature regulator for a heat exchanger, in combination with a valve for varying the flow of an influencing medium through said exchanger, an expansible and collapsible motor vessel operatively connected to said valve and subjected to the heat of said influencing medium, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel and respectively subjected to different sources of temperature control.

12. In a temperature regulator for a heat exchanger, in combination with a valve for varying the flow of an influencing medium through said exchanger, an expansible and collapsible motor vessel operatively connected to said valve and subjected to a source of heat, a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel, and a thermostat for varying the volume of one of said containers.

13. In a temperature regulator for a heat exchanger in combination with a valve for varying the flow of an influencing medium through said exchanger, an expansible and collapsible motor vessel operatively connected to said valve and subjected to a source of heat, a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel, a thermostat for varying the volume of one of said containers, and means for predetermining the temperature at which said thermostat begins to vary the volume of its associated container.

14. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable fluid subjected to different sources of temperature control and conduits between each container and said motor vessel, said motor vessel having a common inlet with which all of said conduits communicate and through which said conduits are in communication.

15. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said motor vessel including an expansible and collapsible corrugated metal wall having a relatively stationary end wall and a relatively movable end wall, said relatively stationary end wall having a tubular projection which cooperates with said movable end wall to guide the same, and said system including a container for said vaporizable liquid communicating with said motor vessel through said tubular projection.

16. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a container for said vaporizable liquid, a thermostat subjected to the controlling temperature and adapted to engage and vary the size of said container, and means for adjusting said thermostat with respect to said container to vary the interval for movement of said thermostat before it engages said container.

17. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a container for said vaporizable liquid, a threaded support for said container, and a thermostat bodily movable with respect to said container and adapted to engage and operate the same, said thermostat having threaded means cooperating with said threaded support whereby the interval between said container and thermostat may be varied.

18. In a temperature regulator for a heat exchanger, in combination with a valve for varying the flow of an influencing medium through said exchanger, an expansible and collapsible motor vessel operatively connected to said valve and subjected to a source of heat, said valve having a universal connection with said vessel and resilient means between said valve and vessel for normally centering said valve, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid in communication with said motor vessel adapted respectively to inject quantities of said vaporizable liquid into said motor vessel in conformity with variations of temperature at the respective containers.

19. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said motor vessel including an expansible and collapsible corrugated metal wall having a relatively stationary end wall and a relatively movable end wall, said relatively stationary end wall having a tubular projection which cooperates with said movable end wall to guide the same, a spring abutment connected to said movable end wall and guided by said tubular projection, a spring cooperating with said abutment and tending to collapse said vessel, and said system including a container for said vaporizable liquid communicating with said motor vessel through said tubular projection.

20. In a temperature regulator for a heat exchanger, in combination with a valve for varying the flow of an influencing medium through said exchanger, an expansible and collapsible motor vessel operatively connected to said valve and subjected to a source of heat, and a system in communication with said motor vessel for predeterminately injecting quantities of a vaporizable liquid into said vessel whereby said liquid is vaporized by the heat applied thereto and said motor vessel actuated, said system including a plurality of containers for said vaporizable liquid communicating with said motor vessel and adapted respectively to inject quantities of said vaporizable liquid into said motor vessel in conformity with variations of temperature at the respective containers, one of said containers being subjected to the temperature of said influencing medium and the other of said containers being subjected to the fluid flowing out of heat exchanging relation with said heat exchanger.

JEAN V. GIESLER.